United States Patent [19]
Johnstone et al.

[11] Patent Number: 4,784,894
[45] Date of Patent: Nov. 15, 1988

[54] MOLDED POLYMER COMPOSITE

[75] Inventors: Richard Johnstone; Edward E. Kirkham, both of Brookfield; Edward J. Hummelt, Wauwatosa, all of Wis.

[73] Assignee: Kearney & Trecker Corporation, West Allis, Wis.

[21] Appl. No.: 592,695

[22] Filed: Mar. 23, 1984

[51] Int. Cl.⁴ .............................................. B32B 5/16
[52] U.S. Cl. .................... 428/212; 428/323; 428/413; 428/480; 428/522
[58] Field of Search ............... 428/323, 413, 480, 522, 428/212

[56] References Cited

U.S. PATENT DOCUMENTS 3,554,941  1/1971  Varnell .
3,801,536  4/1974  Guenantin .
3,856,054  12/1974 Steinberg ........................ 264/128
3,962,142  6/1976  Freeman et al. .
4,130,536  12/1978 Reighter .
4,262,889  4/1981  Moore .
4,371,639  2/1983  Muszynski .
4,375,489  3/1983  Muszynski .
4,382,820  5/1983  Inoue .
4,468,363  8/1984  Meissler .......................... 264/128

FOREIGN PATENT DOCUMENTS 0052166  5/1982  European Pat. Off. ............ 428/323
612610   8/1979  Switzerland ...................... 428/323
1300221  12/1972 United Kingdom ................ 428/323
2058736  7/1983  United Kingdom ................ 428/323
2052514  11/1983 United Kingdom ................ 428/323

OTHER PUBLICATIONS

Ciba-Giegy Brochure, Technical Notes 2/1980, pp. 2–9.
Werkstatt und Betruieb, "Methacrylate Resin Concrete", H. Schultz and G. Nicklau, vol. 115, pp. 747–750 (1982) (with translation).
Werkstatt und Betrieb, "Concrete in Machine Tool Construction", H. Grab et al, 109 (1976) 4.
Machinery and Production Engineering, "Concrete in Machine Tools," N. A. Butterworth, et al., 116 (1970)2999, pp. 703–709.
The Engineer, "Concrete for Machine Tools," H. Kent-Norris, LXX (1940) p. 187.
Industrial and Engineering Chemistry: "Grading Aggregates," C. C. Furnas, vol. 23, 90.9, pp. 1052–1059.
Journal of the American Ceramic Society: "Mechanical Packing of Spherical Particles," R. K. McGeary, vol. 44, No. 10, pp. 513–522.

Primary Examiner—George F. Lesmes
Assistant Examiner—P. R. Schwartz
Attorney, Agent, or Firm—Quarles & Brady

[57] ABSTRACT

A composite for constructing an article which is composed of a nonmetallic substance as represented by igneous rock of different particle sizes which are compacted and then surrounded by a solidified plastic resin. In a preferred manner, the igneous rock material is a selected type of basalt with the basalt particles being of different mesh sizes to be compacted into a mold. After compaction, the plastic resin as represented by an epoxy resin is introduced into the mold so as to displace air from any voids surrounding the basalt particles and to surround them with a resin which later solidifies. A novel resin delivery system is also presented.

15 Claims, 4 Drawing Sheets

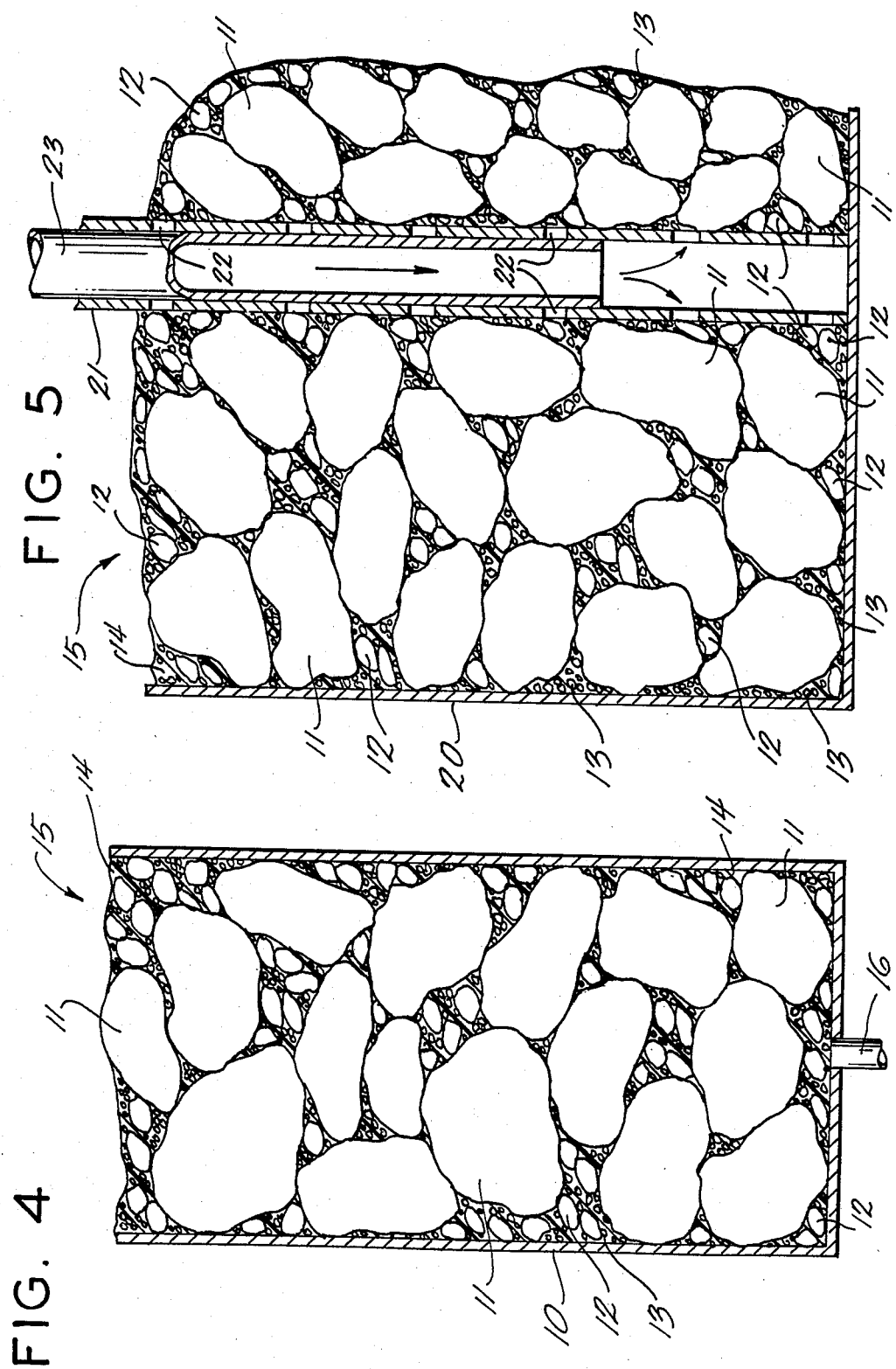

MOLDED POLYMER COMPOSITE

BACKGROUND OF THE INVENTION

This invention relates to a composite for constructing a molded article wherein this composite includes an igneous rock. More particularly, the invention relates to a composite formed primarily of a basalt igneous rock of varying particle sizes surrounded by a solidified epoxy resin to result in a rigid structure having high strength and superior vibration damping properties than previously attained. The invention further relates to a method for forming a composite of such type.

The prior art teaches the use of polymeric materials to adhere granite chips as fillers into a composite for machine tool beds. Examples of such are a brochure by Ciba-Geigy designated Technical Notes 2/1980, describing an Epoxy "Concrete" wherein a particular epoxy resin is combined with granite aggregates.

In Swiss Patentschrift No. 612 610 a machine support is described which is composed of a mixture of sand and gravel which is bound by a synthetic adhesive agent. The prior art in an article entitled "Methacrylate Resin Concrete" by H. Schulz and G. Nicklau, Werkstatt und Betrieb 115 (1982) 11. refers to the use of methacrylate resin and basalt in the manufacture of surface plates and measuring machine bases. In U.S. Pat. No. 4,382,820 a structural member for a machine tool body is described of the nonmetallic type wherein cement, concrete cement or ceramic is utilized as the base material into which solid objects such as fibers, filaments and metals are placed as reinforcing elements. The grading of aggregates to obtain maximum density of solid material is known and is referred to in an article entitled "Grading Aggregates" in *Industrial and Engineering Chemistry* Vol. 23, No. 9, pages 1052 to 1058, as well as in the *Journal of American Ceramics Society* Vol. 44, No. 10, pages 513 to 522, entitled "Mechanical Packing of Spherical Particles".

Nowhere in the prior art is there illustrated the use of igneous rock material in the form of a multiplicity of discrete solid particles of different particle sizes to be compacted in a manner such that a minimum amount and volume of voids are present between the solid particles with these voids being filled with a solidified plastic to result in a rigid article having high strength and high vibration damping properties. Neither does the prior art disclose the use of basalt in a compacted form of solid particles of different size in combination with a plastic resin to result in a molded article with unique features as described herein.

It is an advantage of the present invention to provide a composite for constructing a molded article which employs a unique combination of igneous rock material and a solidified plastic resin. Other advantages are the utilization of an igneous rock material as represented by basalt in combination with a cycloaliphatic epoxy resin to result in a molded article with high strength and vibration damping properties as well as having a smooth and pleasing appearance as it is released from a mold; a unique composite to which additional filler materials can be added that can be formed into a variety of shapes; a method of making molded articles which is easily performed yet does not require special tooling or handling procedures and will result in a composite having a substantially reduced number of voids therein.

SUMMARY OF THE INVENTION

The foregoing advantages are accomplished and shortcomings of the prior art are overcome by the present composite for molding an article wherein an igneous rock material in the form of a multiplicity of discrete solid particles with different particle sizes is arranged and compacted in a manner to result in a high degree of rock-to-rock contact such that a minimum number and volume of voids is presented therebetween. A solidified plastic material fills the voids between the solid particles providing a bonding material therefor. In a preferred manner, the igneous rock material is a basalt which preferably is present in an amount greater than 70% by volume of the composite and preferably with the resin present in an amount of less than 30% by volume of the composite. Also preferably, the bonding material is an epoxy resin of the cycloaliphatic type and particularly is a copolymer of bis(2,3-epoxycyclopentyl) ether and ethylene glycol. Also preferably, in order to obtain the maximum stiffness in the article the particle sizes of the preferred basalt material should be of at least three different sizes so as to be readily compacted with a high degree of rock contact and to result in the minimum amount of voids therebetween.

A unique method of making an article is also presented wherein a multiplicity of discrete solid particles of an igneous rock material is placed in a mold with the discrete particles being of different sizes and compacted in a manner such that a minimum amount of voids are created between the particles. A plastic resin material is then flowed around the particles so as to fill the voids and to displace any air therebetween. To fill the voids and expel the air a definite resin-air interface is maintained by introducing the plastic resin at the bottom of the mold and in a direction toward the top. In order to optimize flowability of the resin, both the solid particles and the resin are heated prior to introduction of the resin into the mold. As is well known, resin viscosity is reduced by heating.

BRIEF DESCRIPTION OF THE DRAWINGS

A better understanding of the present invention for forming a molded component, as well as a method of fabricating it, will be accomplished by reference to the drawings wherein:

FIG. 4 is a view in vertical cross section illustrating one method of injecting resin into a mold.

FIG. 5 is a view similar to FIG. 4 illustrating an alternative method of injecting the resin.

DESCRIPTION OF THE EMBODIMENTS

While various igneous rocks can be employed in the composite, the preferred aggregate is a variety of basalt having high strength and high modulus. Typical values are:

| | |
|---|---|
| Compressive Strength | 64,000 p.s.i. |
| Tensile Strength | 3,200 p.s.i. |
| Compressive Modulus of Elasticity | 12,000 p.s.i. |
| Tensile Modulus of Elasticity | 17,000 p.s.i. |

It should be noted that basalt differs substantially from granite in both mineral content and grain structure. Granite is acidic, whereas basalt is basic. When formed in early geologic times, basalt was extruded and cooled quickly creating very fine grains. Granite, on the other hand, was intrusive or slowly cooled forming very large grains and a non-homogeneous structure. The coarser grained granite has poorer physical properties than those possessed by the finer grained basalt.

Figure 6:
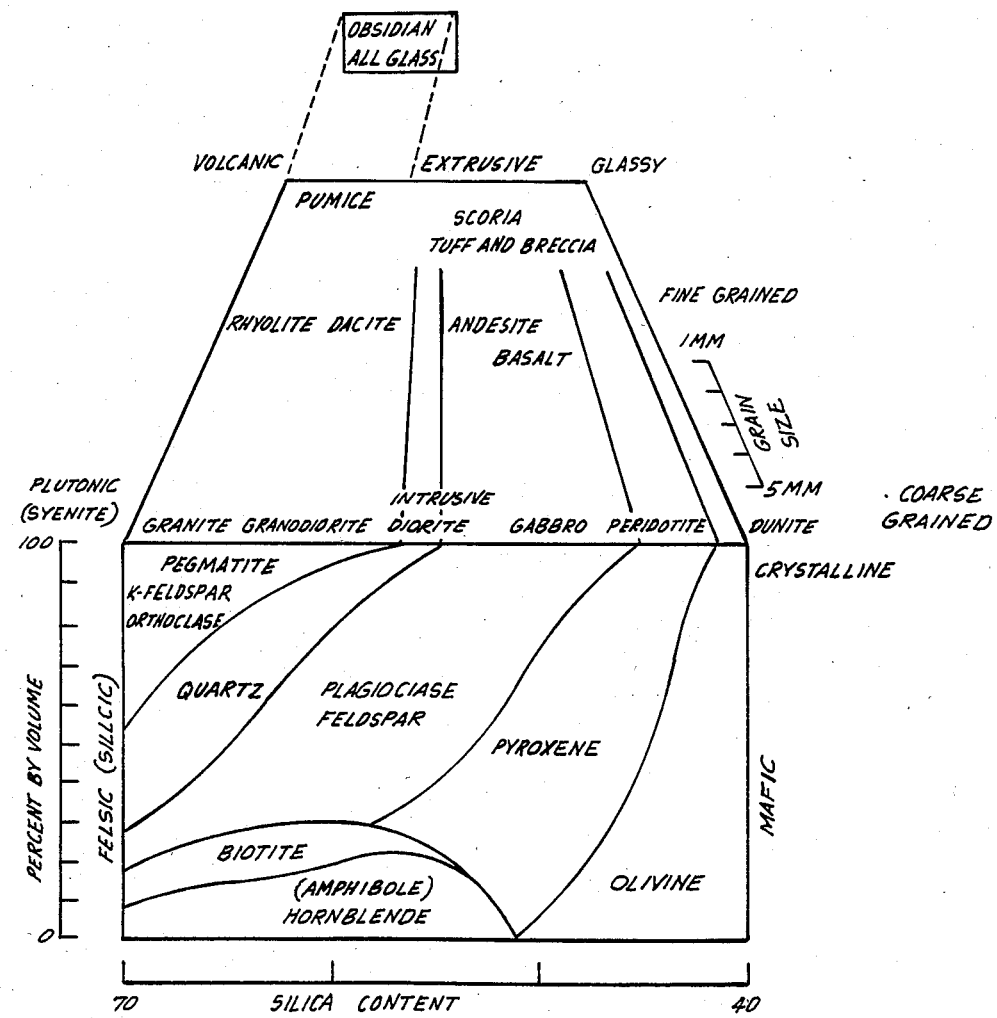
FIG. 6 is a graph comparing certain properties of the igneous rocks, including granite and basalt.

Basalt is composed largely of the mineral plagioclase feldspar (approximately 85%); lesser minerals include pyroxene and olivine. Conspicuously absent from basalt is quartz; granite, however, contains more than 25% quartz. Certain characteristics of basalt and granite are compared in FIG. 6, wherein the major differences in mineral composition and grain size are illustrated in a three-dimensional graph.

The crushed basalt ultilized in this invention should be graded by particle size and thoroughly dried in order that the moisture will not be taken up by the polymeric resin thus preventing proper curing. To aid in this, storage bins for the crushed aggregate should be provided which will afford the introduction of warm air so as to be passed up through the aggregate in order to effect proper drying. Alternatively, vacuum drying of the aggregate could also be utilized with, or as an alternative to, heated air drying. This method would involve evacuating a chamber containing the aggregate to boil off surface moisture. Still a further procedure in drying an aggregate would be to combine it with a drying chemical such as portland cement.

While various resinous materials could be utilized in the composition and method of this invention, certain cycloaliphatic epoxides are preferred. For example, the cycloaliphatic epoxide ERLA-4617 which is available from the Union Carbide Corporation and is the copolymer of bis (2,3-epoxycyclopentyl)ether and ethylene glycol, catalyzed with a tertiary amine. The following Table I indicates the high strength of the ERLA-4617 resin versus a common resin ERLA-2772 which is a bisphenol A-epichlorohydrin epoxy resin also available from Union Carbide.

TABLE I

| | | Cast ERLA-4617 cured with m-PDA* | Cast ERLA-2772 cured with m-PDA* |
|---|---|---|---|
| Modulus (psi) | Compressive | 890,000 | 441,000 |
| | Tensile | 783,000 | 458,000 |
| | Flexural | 815,000 | 462,000 |
| Strength (psi) | Compressive | 32,800 | 19,200 |
| | Tensile | 19,200 | 12,900 |
| | Flexural | 31,000 | 17,500 |
| Viscosity cps @ 25° C. | | 80–100 | 7000–9000 |

*Metaphenylenediamine

The following Examples are set forth for the purpose of illustrating the present invention and should not be construed to limit the invention to the precise ingredients, proportions, temperatures or other conditions specified.

EXAMPLE 1

| Materials | Identification and Source | Quantity (grams) | Sizes (ASTM E-11) |
|---|---|---|---|
| Basalt | | 1044 | $-\frac{3}{8} + \frac{3}{8}$ |
| | | 696 | $-8 + 16$ |
| | | 633 | $-50 + 100$ |
| Resin: Bis phenol A-epichlorohydrin epoxy resin and an aliphatic reactive diluent ($C_{12}$–$C_{14}$ alphatic glycidyl ether) | D.E.R. 324 resin, Dow Chemical Company | 125 | |
| Curing Agent: methyl tetrahydro phthalic anhydride | AC-220-JQ Anhydrides and Chemicals, Inc. | 100 | |
| Catalyst: 1-methylimidazole | BASF Wyandotte | .625 | |

The basalt is crushed, rinsed in clear water and dried.

The interior of a suitable mold such as indicated at 10 in FIG. 4 is previously polished to attain a smooth surface finish. The mold in this instance is rectangular and measures 2 7/16 inches in length x 2⅝ inches in width and 12⅛ inches in height. The mold interior is coated with a suitable mold release compound such as MMS 5050 available from Ecolab, Inc. A mixture of resin, curing agent and catalyst is prepared by preheating it to 100° C.

The basalt aggregates are placed in the previously prepared mold and compacted using a suitable compaction means such as an air hammer. The mold and compacted aggregate are then heated to 100° C. The prepared fluid resin mixture at 100° C. is thereafter placed in a pressurized container and injected through a tube or conduit such as indicated at 16 in FIG. 4 using a pressure regulator to control the flow rate. The injection pressure is continuously adjusted upwards to a maximum of 10 psig. As the resin rises through the mold, a definite resin-air interface is maintained expelling the air and filling the voids between the solid basalt particles.

As indicated in FIG. 4, the various sizes of the compacted basalt particles are indicated with the numbers 11, 12 and 13. The numeral 11 indicates the largest sized basalt particles in the $-\frac{3}{4} + \frac{3}{8}$ mesh size, 12 indicates the intermediate size in the $-8 + 16$ mesh size and 13 the smaller size in the $-50 + 100$ mesh size. The numeral 14 illustrates the resinous plastic material which surrounds the particles resulting in a molded article such as a machine tool component.

When the molded article is released from the mold it has a smooth and shining surface with few air pockets or voids. The molded article would require no further preparation before use.

Example I demonstrates a definite resin-air interface which is maintained by the force of gravity acting upon the resin. Alternatively, the definite resin-air interface would be maintained by applying other force fields to the mold, such as a centrifugal force field. For example, a centrifugal force field could be created by rotating or otherwise moving the mold. In the latter example, the resin would be injected at the outer periphery of the mold.

EXAMPLE 2

In this particular Example a cycloaliphatic epoxide compound previously referred to in Table II as ERLA-4617 is employed. This particular resin is utilized in the same manner and in the same proportions with the basalt aggregate as indicated in Example 1. A suitable curing agent such as the indicated m-phenylenediamine can be employed. All other conditions for introducing the resin and casting of the composite is as previously stated in Example 1.

It should be pointed out that FIG. 4 illustrates one method of introducing the resin material 14 between the different sizes of compacted basalt particles 11–13, wherein the resin material is introduced under pressure from the bottom of the mold through conduit 16. If desired, a mold such as 20 illustrated in FIG. 5 could be utilized. A stationary delivery tube 21 with apertures 22 is positioned inside mold 20 and preferably in a central manner. Retractable delivery tube 23 for delivery of resin from the top to the bottom of the mold is coaxially placed within tube 21. The introduction of resin is initially from the bottom of the mold and offers the advantage of air elimination toward the top, the air eventually exiting therefrom as the resin material gradually fills the mold from the bottom. The added advantage of mold device 20 with retractable delivery tube 23 is the fact that the level of resin is adjustable through the retraction of tube 23 and its selective positioning over apertures 22 for the purpose of gradual resin introduction and air elimination.

Figure 1:
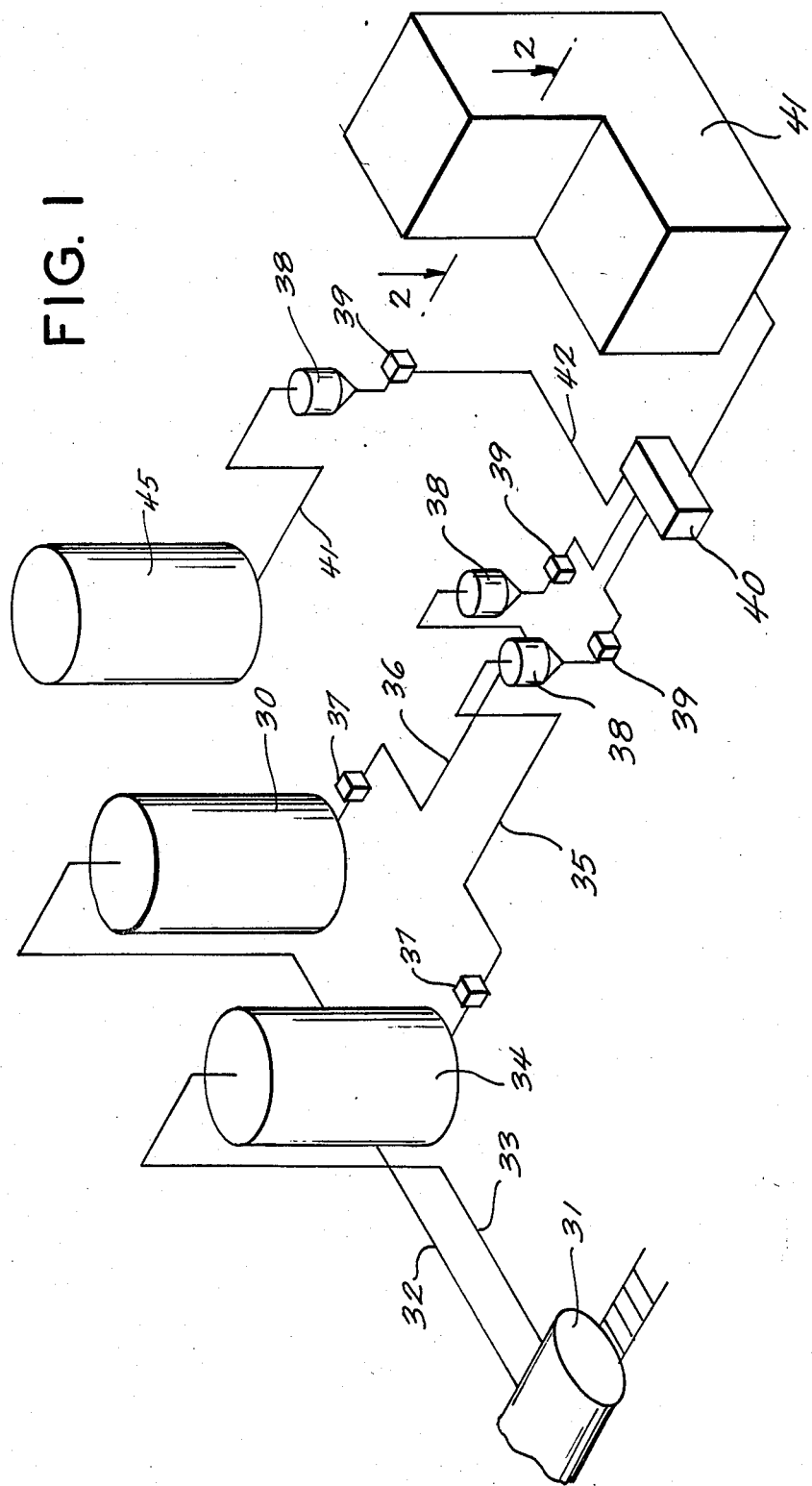
FIG. 1 is a diagrammatic view illustrating a typical production system for resin injection into a mold for forming a component in accord with the principles of the invention.

FIG. 1 represents a typical layout of a large scale injection station, with high production capacity to produce a molded machine tool member. Bulk resin is transferred from tank cars indicated by the numeral 31 through suitable conduits such as 32 and 33 communicating with primary storage tank 34 for resin and tank 30 for the hardener or curing agent. The resin and curing agent would be routed through respective lines 35 and 36 by means of pumps 37 to conditioning tanks 3B for conditioning. Subsequently, the product is transferred by booster pumps 39 to a proportioning, mixing and dispensing machine 40. A suitable coloring pigment is added to the molded product which is stored in tank 45 and delivered to machine 40 through conduits such as 41 and 42 interconnected to conditioning tank 38 and booster pump 39. From there the product is introduced into the aggregate filled mold 41.

Figure 2:
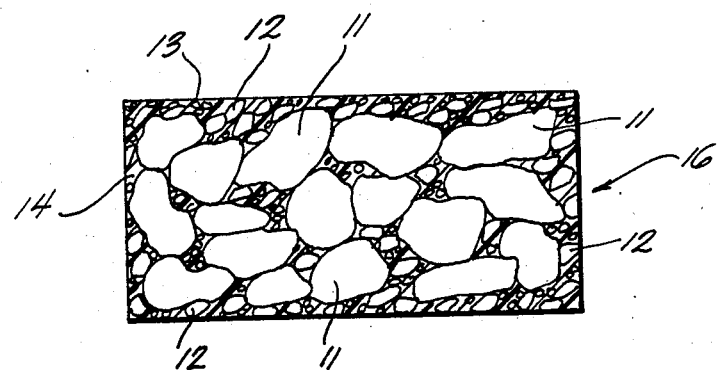
FIG. 2 is a view in horizontal section taken along line 2—2 of FIG. 1 and illustrating the composition of this invention after it is molded into an article or object.

As indicated earlier, the finished molded composite is as illustrated in FIGS. 1 and 2 and indicated by the numeral 16 in FIG. 2 where a rectangular cross section of the composite is particularly shown after it is removed from mold 41.

Figure 3:
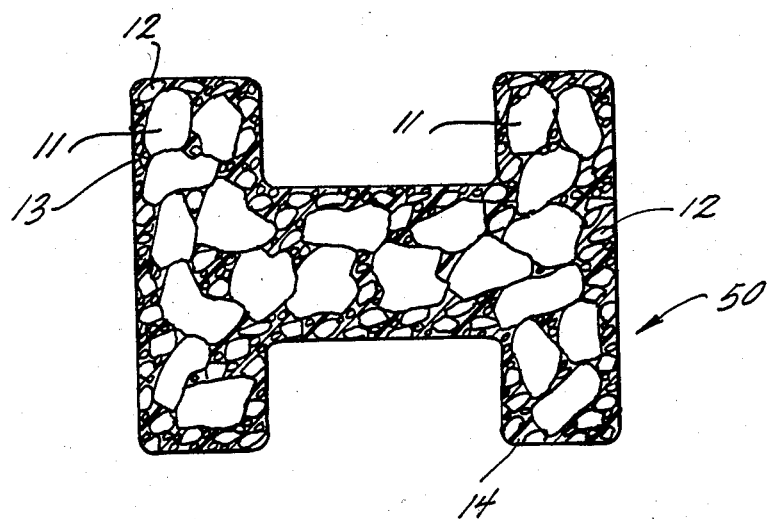
FIG. 3 is an alternative embodiment illustrating an article of different geometric configuration.

FIG. 3 depicts another geometric configuration as indicated by the numeral 50. This particular embodiment simulates a typical I - beam support. It will be noted that the basalt particles 11, 12 and 13 in the embodiments of this invention are in a compacted state with a high degree of rock-to-rock contact as well as being surrounded with an adhesive layer of resinous plastic.

The molded article 16 in FIG. 2 as it would be produced from the mold 41 in FIG. 1 is illustrated in the form of a machine tool member and particularly a column and bed. The composite of this invention is also capable of being molded into the following machine related components: uprights, saddles, pallets, magazines, spindle heads, belt guards, gear covers and boxes, tool changers, as well as structures for material handling systems.

It is anticipated that in other important uses, the composite can be molded without limitation into bathtubs, manhole covers, door handles, furniture and construction materials.

Certain epoxy resins have been illustrated herein with the cycloaliphatics being preferred. In addition to the bisphenol A-epichlorohydrin epoxy resins, other epoxy resins such as the novolac resins and the linear aliphatic epoxy resins could be employed while still attaining the described advantages. While epoxy resins have previously been described, other resinous materials with relatively low viscosities which can form the desired bonding between the varying sizes of compacted igneous rock are the polyesters or methacrylates.

It is preferred to employ igneous rock in the form of at least three different particle size ranges. However, if desired, a plurality of different mesh size ranges as represented by more than three particle size ranges could be utilized with the smaller particle sizes being employed to fill the voids between the larger particles as previously explained. It should be pointed out that for consistent attainment of high strength during processing, the largest particle size should be less than one-third of the wall thickness in the region of the component member in which it is placed.

While in the previous Examples epoxy resins are employed with basalt alone, if desired, other reinforcing or filler materials could be employed with the basalt particles such as flakes or fibers in the form of steel fibers. Flakes and steel fibers as composite reinforcements offer good strength and stiffness. Flake filled composites provide superior vibratory damping; the large number of the polymer layers between the individual flakes, all of which dissipate energy during deformation, is responsible for the high level of damping in flake filled composites. The high strength and rigidity of a flake and/or steel fiber filled composite is due to their strength and rigidity as well as their high load acceptance. The high load acceptance is due to their high aspect ratios.

As indicated earlier, an important aspect of this invention is the fact that igneous rocks of varying particle sizes are tightly compressed or compacted in the mold device with a high degree of rock-to-rock contact and then surrounded with a solidifiable resinous plastic. To obtain maximum stiffness and vibration damping, it is essential that a maximum amount of igneous rock material be utilized with a minimum amount of the resinous plastic. Additional benefits are obtained if the particular igneous rock is basalt and is combined in conjunction with cycloaliphatic resinous material wherein one of the polymer units of the copolymer is bis (2,3-epoxycyclopentyl) ether.

The present invention provides a unique composite for molding such articles as machine tool components utilizing readily available materials and offering high strength and vibration damping. The materials employed are relatively inexpensive thus lending themselves to a low cost composite and final product. Further, the product of this invention offers a pleasing appearance as it is removed from the mold having a smooth and shining surface of the desired color thus requiring no further preparation prior to use.

Although the illustrative embodiments of the invention have been described in considerable detail for the purpose of fully disclosing a practical implementation of this invention, it is to be understood that the particular components and compositions shown are intended to be illustrative only and that various novel features of the invention may be incorporated in other structural forms without departing from the spirit and scope of the invention as defined in the subjoined claims.

I claim:

1. A composite for constructing an article comprising:
   an aggregate formed of igneous rock material in a multiplicity of solid particles having discrete different particle sizes arranged so that the particles of one size are disposed in the interstices formed between the particles of the next larger size and compacted in a manner to result in a high degree of rock-to-rock contact with a minimum number and volume of voids between the solid particles; and
   a solidified plastic resin filling said voids between said solid particles, said solidified resin providing a bonding material for said solid particles.

2. The composite as defined in claim 1 wherein said igneous rock material is basalt.

3. The composite as defined in claim 2 wherein said basalt is present in a plurality of particle size ranges and in an amount of at least 70% by volume of said composite.

4. The composite as defined in claim 2 wherein said resin is present in an amount of less than 30% by volume of said composite.

5. The composite as defined in claim 2, further including a material present in an amount to act as a drying agent.

6. The composite as defined in claim 2 wherein said solidified plastic resin is a polyester resin.

7. The composite as defined in claim 2 wherein said solidified plastic resin is a methacrylate resin.

8. The composite as defined in claim 1 wherein said solidified plastic resin is an epoxy resin.

9. The composite as defined in claim 8 wherein said epoxy resin is a cycloaliphatic epoxy resin.

10. The composite as defined in claim 9 wherein said epoxy resin is a copolymer of bis(2,3-epoxycyclopentyl) ether and ethylene glycol.

11. The composite as defined in claim 1 wherein said solidified plastic resin is a bisphenol A-epichlorohydrin epoxy resin.

12. The composite as defined in claim 1 in the form of a machine tool molded component.

13. The composite as defined in claim 1 wherein said particles are present in a plurality of different mesh size ranges and further includes a reinforcing material in the form of flakes or fibers.

14. A composite according to claim 1 wherein said aggregate is formed of three different sizes of solid particles with the medium size particles being disposed in the interstices between the largest size particles and the smallest size particles being disposed in the spaces between the medium size particles.

15. A composite according to claim 14 wherein all of the particles in said aggregate are formed of basalt.

* * * * *